United States Patent
Adler et al.

(10) Patent No.: US 6,635,339 B1
(45) Date of Patent: Oct. 21, 2003

(54) OPEN-CELL EXPANDED CERAMIC WITH A HIGH LEVEL OF STRENGTH, AND PROCESS FOR THE PRODUCTION THEREOF

(75) Inventors: Joerg Adler, Meissen (DE); Michael Teichgraeber, Coswig (DE); Gisela Standke, Dresden (DE); Helmut Jaunich, Raesfeld (DE); Heike Stoever, Dresden (DE); Reinhard Stoetzel, Borken (DE)

(73) Assignee: Frauhofer-Gesellschaft zur Forderung der Angewandten Forschung E V, Munich (DE)

( * ) Notice: Subject to any disclaimer, the term of this patent is extended or adjusted under 35 U.S.C. 154(b) by 0 days.

(21) Appl. No.: 09/194,697

(22) PCT Filed: May 30, 1997

(86) PCT No.: PCT/EP97/02828

§ 371 (c)(1),
(2), (4) Date: May 24, 1999

(87) PCT Pub. No.: WO97/45381

PCT Pub. Date: Dec. 4, 1997

(30) Foreign Application Priority Data

May 30, 1996 (DE) .......................................... 196 21 638

(51) Int. Cl.$^7$ ................................................. B32B 5/14
(52) U.S. Cl. ............................. 428/307.7; 428/312.6; 427/244; 427/316; 427/376.1; 427/376.2; 427/376.6
(58) Field of Search ........................... 428/307.7, 312.6; 427/244, 316, 322, 376.1, 376.2, 376.6

(56) References Cited

U.S. PATENT DOCUMENTS

| | | | |
|---|---|---|---|
| 3,090,094 A | * | 5/1963 | Schwartzwalder et al. |
| 3,451,841 A | * | 6/1969 | Kesten et al. |
| 4,187,344 A | * | 2/1980 | Fredriksson |
| 4,559,244 A | * | 12/1985 | Kasprzyk et al. |
| 4,670,304 A | * | 6/1987 | Miura et al. |
| 5,019,430 A | * | 5/1991 | Higgins et al. |
| 5,316,069 A | * | 5/1994 | Aghajanian et al. |

FOREIGN PATENT DOCUMENTS

| | | |
|---|---|---|
| EP | 0115742 A1 * | 12/1983 |
| EP | 0 369 098 A | 5/1990 |
| GB | 2 097 777 A | 11/1982 |
| JP | 59 169 963 | 9/1984 |
| JP | 59 169 963 A | 9/1984 |
| JP | 62 216 981 A | 9/1987 |
| JP | 63 011 589 A | 1/1988 |
| JP | 63 159 267 A | 7/1988 |
| JP | 01 053 760 A | 3/1989 |
| JP | 64 53 760 | 3/1989 |
| JP | 05 051278 A | 3/1993 |

OTHER PUBLICATIONS

*Chemical Abstracts, vol. 102, No. 4, Jan. 28, 1985 Columbus, Ohio, US; abstract No.30800c, XP000284727.
*Chemical Abstracts, vol. 110, No. 4, Jan. 23, 1989 Columbus, Ohio, US; abstract No. 28104a XP000019575.
*Chemical Abstracts, vol. 111, No. 14 Oct. 2, 1989 Columbus, Ohio, US; abstract No.119809w XP000153221.
*Patent Abstracts of Japan vol. 017, No. 361 (C–1080), Jul. 8, 1993.
*Chemical Abstracts, vol. 107, No. 26, Dec. 28, 1987 Columbus, Ohio, US; abstract No. 241497a XP0000178973.
*Chemical Abstracts, vol. 108, No. 20, May 16, 1988 Columbus, Ohio, US; abstract No. 172362j XP000018801.
English Abstract of JP 59 169 963, Sep. 26, 1984.
English Abstract of JP 64 53 760, Mar. 1, 1989.

* cited by examiner

Primary Examiner—Tom Dunn
Assistant Examiner—Christina Ildebrando
(74) Attorney, Agent, or Firm—Reed Smith LLP

(57) ABSTRACT

The disclosed invention relates to the field of ceramics and concerns an open-cell expanded ceramic which may be used in the form of a deep-bed filter, and a process for the production thereof. The primary object is to produce an open-cell expanded ceramic by a simple and economical process. This object is attained by an open-cell expanded ceramic in which the inner cavities, cracks and the porosity of the ceramic members are filled partially or completely by one or a plurality of metal and/or ceramic phases and/or glass phases. The open-cell expanded ceramic is also produced in that during or after sintering the cavities, cracks and the porosity of the ceramic members are partially or completely filled with a melt or a suspension which melt below the melting temperature of the expanded ceramic, have a coefficient of expansion similar to the coefficient of expansion of the expanded ceramic, and a very good wetting capacity, and only react partially or not at all with constituents of the expanded ceramic.

15 Claims, No Drawings

OPEN-CELL EXPANDED CERAMIC WITH A HIGH LEVEL OF STRENGTH, AND PROCESS FOR THE PRODUCTION THEREOF

BACKGROUND OF THE INVENTION a) Field of the Invention

The invention relates to the field of ceramics and is directed to an open-cell expanded ceramic with high strength such as can be used, e.g., for deep-bed filters, supporting bodies for filtration, heat exchangers, regenerators, electrically heatable thermostats, catalytic substrates or supports, burner elements for surface radiant burners and volume burners, high temperature reaction chambers, acoustic dampening or reinforcing material for panels for high temperature, and to a process for the production thereof.

b) Description of the Related Art

Processes are known for the production of open-cell expanded ceramics by the Schwartzwalder method, as it is called, which is utilized commercially and is most common. According to this process, the desired structural component part is cut out of an open-cell polymer foam and subsequently impregnated with a suspension of ceramic particles and water or solvent. Afterward, the impregnated polymer foam is repeatedly pressed out mechanically and then dried. The polymer foam is then burned out and the sintering of the remaining ceramic coating is subsequently carried out (U.S. Pat. No. 3,090,094).

Open-cell expanded ceramic produced according to this process is a casting of the cell-like polymer structure of the starting material. Because the polymer foam is burned out, the remaining ceramic webs or struts are hollow.

These struts have a three-edged cross section and the cavities also have a three-edged shape in cross section. The ceramic coating is frequently cracked at the edges of the cavities. The cavities and cracks result in very low mechanical strength. Since the contraction of the ceramic coating during sintering further increases susceptibility to cracking, relatively low-contraction substances are used, although the latter have a high internal porosity after sintering. This likewise leads to a low mechanical strength (J. A. Ceram. Soc. 77 (6), 1467–72 (1994)).

In order to increase strength, it has already been attempted to provide the open-cell expanded ceramic with greater strength by applying one or more subsequent coats to the ceramic struts of the foam before or after sintering the ceramic foam. These subsequent coats are applied by impregnating either the coated polymer foam or the sintered expanded ceramic with a ceramic slurry (suspension) (e.g., GB 2097777).

A problem consists in that the excess suspension cannot be pressed out of the cells of the expanded ceramic mechanically without destroying the now rigid foam structure; for this reason, very thin suspensions with a low solid content must be used which can drip without leading to a closure of the cells and accordingly to a reduction in the number of open cells. Thin suspensions with low solid content have the disadvantage that the coating of ceramic particles is only thin and this coating is interrupted during the drying of the suspension by drying cracks or, during the sintering, by contraction cracks.

Further, the efficacy of an external multiple coating of the cell struts is only slight because the unfavorable structure of the cavities in the struts is not overcome. Further, a subsequent coating reduces the volume of the free cells of the expanded ceramic, which is disadvantageous for most applications (J. Am. Ceram. Soc. 77 (6), 1467–72 (1994), page 1467, second paragraph, left).

A process is known from EP 0369 098 wherein a presintered open-cell ceramic foam is impregnated with a suspension of colloidal refractory oxide and a refractory oxide powder under a vacuum and, after the suspension drips off, is dried and sintered. Accordingly, in addition to a coating of the cell struts (as was mentioned above), the cavities of the cell struts must also be filled with the suspension during impregnation. As was already described above, a very thin suspension must be used for the impregnation, so that only a very small proportion of ceramic particles can reach the cavities of the struts during the impregnation. Therefore, the proportion by volume of the ceramic phase after sintering is only extremely small. Further, as was mentioned above, the layers of low-concentration ceramic suspension crack repeatedly during drying and sintering, so that their reinforcing efficiency is further diminished.

It is also known to produce an open-cell carbon foam by means of CVD/CVI. In this case, the carbon foam is produced by pyrolysis of an open-cell polymer foam and is subsequently cut according to the desired geometry of the structural component part. The carbon foam is then coated with ceramic components by means of CVD/CVI (Ceram. Bull. Vol. 70, No. 6,1991, 1025–1028). A production process of this kind is very expensive and requires elaborate plant technology. The expanded ceramic produced by this process is also a casting of the cell-like polymer structure of the starting material. The ceramic struts are formed of a tight layer of the applied ceramic, wherein the struts are formed internally by the original carbon skeleton. Due to the tightness and strength of the ceramic coating, the expanded ceramic is very strong on the whole but, because of the internal carbon skeleton which has substantially lower strength than the ceramic layer, the mechanical strength is still not adequate under high loading. Further, the carbon skeleton is exposed to oxidative processes at high temperatures which greatly undermines the otherwise favorable stability of the expanded ceramic at high temperatures. For these reasons, the carbon skeleton is removed for applications at higher temperatures, but this again results in hollow ceramic struts.

Another known method for producing an open-cell expanded ceramic is direct expansion using foaming agents. For this purpose, a suspension of ceramic particles and water or a solvent is first produced. A foaming agent and polymer components are added to this suspension. This suspension is subsequently cast in a mold and the reaction of the foaming agent is initiated. This reaction brings about the development of gas bubbles which cause a foaming of the suspension. The polymer components are then cross-linked, so that the foam hardens. The polymer components are then burned out and the remaining foam is sintered (Product Brochure: Foaming Agents W 53 FL, Zschimmer & Schwartz GmbH & Co., Lahnstein). The disadvantage of this process consists in that the foaming is difficult to control.

An expanded ceramic produced by this process has a net-like structure. The ceramic struts are composed of ceramic through the entire cross section after sintering. The external geometry of an expanded ceramic of this type is limited at least in one dimension by the open mold in which the foaming takes place. The sintered expanded ceramic is very microporous because the suspension does not allow a high concentration of particles. At higher concentrations, the suspension is too heavy and foaming takes place only incompletely or not at all. Low solid concentrations lead to a very loose structure of the burned out ceramic. When the ceramic is compressed by contraction during sintering, stresses and cracks also occur, so that the strength of the ceramic is limited. If a ceramic system with low contraction is selected, the porosity is maintained which likewise results in low strength. Further, it is disadvantageous that the pore spacing is difficult to control in general and especially over the height of the mold which impairs the through-flow capacity of the expanded ceramic.

Further, a process for the production of expanded ceramic through direct expansion by means of air is also known. For this purpose, a polymer component is added to a suspension of ceramic particles and water or a solvent. Subsequently, air bubbles are introduced into the suspension by a high-speed special stirrer. The foamy suspension is then poured into a mold and the foam is hardened by cross-linking the polymer component. The polymer component is then burned out and the foam is sintered.

Only very fine foams with few open cells can be produced by the process mentioned above. The struts are formed of ceramic material over the entire cross section. The strength of these foams is likewise limited because a high concentration of particles is not possible and stresses and cracks which limit the strength of the expanded ceramic likewise occur during contraction while sintering. Further, the flow through the foam is also impaired in this case because the "pores" are often closed cells.

OBJECT AND SUMMARY OF THE INVENTION

It is the primary object of the invention to produce an open-cell expanded ceramic with improved strength by a simple and economical process.

This object is met in accordance with the invention by an open-cell expanded ceramic with high strength comprising ceramic struts having inner cavities, cracks and pores and wherein the inner cavities, cracks and pores are filled at least partially with at least one of a group consisting of at least one metal phase, at least one ceramic phase and at least one glass phase.

In the open-cell expanded ceramic with high strength according to the invention, the inner cavities of the ceramic struts, the cracks of the ceramic struts and the pores of the ceramic struts are filled completely or partially with one or more metallic phases and/or ceramic phases and/or glass phases.

The inner cavities of the ceramic struts, the cracks of the ceramic struts and the pores of the ceramic struts are advantageously filled completely or partially with one or more metallic phases.

The inner cavities of the ceramic struts, the cracks of the ceramic struts and the pores of the ceramic struts are likewise advantageously filled completely or substantially completely with one or more ceramic phases.

It is also advantageous when the inner cavities of the ceramic struts, the cracks of the ceramic struts and the pores of the ceramic struts are filled completely or substantially completely with one or more glass phases.

It is also advantageous when the inner cavities of the ceramic struts, the cracks of the ceramic struts and the pores of the ceramic struts are filled completely or substantially completely with silicon or silicon compounds, with molybdenum or metal silicides or with aluminum yttrium oxide or with calcium silicates or strontium calcium silicates or fluorides for silicon carbide expanded ceramics, with copper-titanium alloys or iron-titanium alloys or with titanium carbide for aluminum oxide expanded ceramics, with mullite for zirconium oxide expanded ceramics.

In a further advantageous variant of the invention, the inner cavities of the ceramic struts, the cracks of the ceramic struts and the pores of the ceramic struts of silicon carbide expanded ceramics are filled completely or substantially completely with silicon and/or silicon compounds.

Further, the open-cell expanded ceramics with high strength according to the invention, whose inner cavities of the ceramic struts, cracks of the ceramic struts and pores of the ceramic struts are filled completely or partially with one or more metallic phases and/or ceramic phases and/or glass phases is produced, according to the invention, in that an open-cell polymer foam is cut to size, coated with a suspension of ceramic particles and water or a solvent, pressed out and dried, the polymer foam is then burned out or pyrolized, the coated foam is subsequently sintered and, during or after the sintering, the cavities of the ceramic struts, the cracks of the ceramic struts and the pores of the ceramic struts of the sintered expanded ceramics are filled completely or partially with a melt or a suspension, wherein the melt and the suspension comprise materials which melt below the melting temperature of the expanded ceramics, have a coefficient of expansion similar to that of the expanded ceramics, exhibit very good wetting and react partially or not at all with components of the expanded ceramic, and wherein, when the struts are filled with a suspension, the expanded ceramic filled with the suspension is subsequently heated to a temperature above the melting temperature of the materials, mixtures of materials or reaction products thereof contained in the suspension.

The cavities of the ceramic struts, the cracks of the ceramic struts and the pores of the ceramic struts of the sintered expanded ceramic are advantageously filled with a melt comprising silicon or silicon compounds, molybdenum or metal silicides or aluminum yttrium oxide or calcium silicates or strontium calcium silicates or fluorides for silicon carbide expanded ceramics, copper-titanium alloys or iron-titanium alloys or titanium carbide for aluminum oxide expanded ceramics, mullite for zirconium oxide expanded ceramics.

Also, the cavities of the ceramic struts, the cracks of the ceramic struts and the pores of the ceramic struts of the sintered expanded ceramic are advantageously filled with a melt comprising silicon or silicon compounds, aluminum, boron, iron, copper or oxygen for silicon carbide expanded ceramics.

Another advantageous variant of the invention consists in that the cavities of the ceramic struts, the cracks of the ceramic struts and the pores of the ceramic struts of the sintered expanded ceramic are filled with a suspension which, in addition to water or a solvent, comprises powder of silicon or silicon compounds, molybdenum or metal suicides or aluminum yttrium oxide or calcium silicates or strontium calcium silicates or fluorides for silicon carbide expanded ceramics, copper-titanium alloys or iron-titanium alloys or titanium carbide for aluminum oxide expanded ceramics, mullite for zirconium oxide expanded ceramics. After the cavities of the ceramic struts, the cracks of the ceramic struts and the pores of the ceramic struts are filled with the suspension, drying is carried out. Accordingly, the powder contained in the suspension and/or its reaction products are located in the cavities, cracks and pores. Immediately after drying or later, this sintered expanded ceramic with the powder and/or its reaction products located in the cavities, cracks or pores is heated to a temperature above the melting temperature of the powder components or their reaction products. Accordingly, the powder components and/or their reaction products are melted. This melt then completely or partially fills the cavities, cracks and pores of the sintered expanded ceramic and hardens therein when cooled.

It is also advantageous when the cavities of the ceramic struts, the cracks of the ceramic struts and the pores of the ceramic struts of the sintered expanded ceramic are filled with a suspension which, in addition to water or a solvent, contains powder of silicon or silicon compounds with aluminum, boron, iron, copper or oxygen for silicon carbide expanded ceramics. The suspension is then likewise dried and, immediately after drying or later, is heated to a temperature at which the powder components and/or reaction products melt.

It is also advantageous when the cavities of the ceramic struts, the cracks of the ceramic struts and the pores of the ceramic struts of the sintered expanded ceramic are filled with a suspension which, in addition to water or a solvent, contains powder of glass frit. The suspension is then likewise dried and immediately after drying or later is heated to a temperature at which the powder components and/or reaction products melt.

It is also advantageous to use glass frit comprising frit of one or more boron silicate glasses, aluminum boron silicate glasses and/or lithium aluminum silicate glasses.

It is particularly advantageous when the utilized materials of which the melt is comprised or which are contained in the suspension have a contact angle of 0 to 500 in the molten state.

In another possible arrangement of the invention, the utilized materials of which the melt is comprised or which are contained in the suspension react partially with components of the expanded ceramic in the molten state and accordingly lead to a reaction bonding with the expanded ceramic.

The process according to the invention can advisably also be arranged in such a way that the filling of the inner cavities of the ceramic struts, cracks of the ceramic struts and pores of the ceramic struts is carried out by means of melt infiltration.

The melt infiltration is advantageously carried out by wick infiltration, bulk infiltration or paste infiltration.

The expanded ceramic finally comprises the ceramic coating which remains after the polymer foam is burned out. According to the invention, a melt or a suspension is introduced into the inner cavities of the ceramic struts and the cracks of the ceramic struts of this expanded ceramic.

As a result of the solution according to the invention, an open-cell expanded ceramic with high strength and uniform pore structure can be produced by a simple and economical process. This is achieved in that the former cavities, cracks and pores in the ceramic struts are filled with a melt which then solidifies.

Further, the ceramic struts can also be filled with a suspension. The expanded ceramic which is filled in this way is then heated to a temperature which lies above the melting temperature of the materials, mixtures of materials or reaction products thereof contained in the suspension. The powder components which have been contained in the suspension are melted and, due to the high wetting of the ceramic with the melt, a redistribution is brought about in such a way that the inner cavities of the ceramic struts, the cracks of the ceramic struts and the pores of the ceramic struts are completely or substantially completely filled with the melt. Cracks which may possible occur in the dried suspension are accordingly eliminated.

When this variant of the invention is realized, after the inner cavities of the ceramic struts, the cracks of the ceramic struts and the pores of the ceramic struts are filled, only a partial filling of these areas with powder and/or its reaction products is initially carried out in accordance with the solid content of the suspension that is used. However, in this process variant, the ceramic struts are coated to varying degrees of thickness at the outer surface with a suspension at the same time as the inner cavities of the ceramic struts, the cracks of the ceramic struts and the pores of the ceramic struts are filled. After drying, a variously thick layer of powder components and/or their reaction products is present at the outer surfaces of the ceramic struts. When temperature is increased to a temperature above the melting temperature of the powder components and/or their reaction products, these layers also melt and completely or substantially completely fill the inner cavities of the ceramic struts, the cracks of the ceramic struts and the pores of the ceramic struts through the accesses to the cavities and the cracks and through the pores in the ceramic struts.

Viscous-to-pasty suspensions which cause the ceramic struts to be thickly coated, as well, can also be used to fill the inner cavities of the ceramic struts, the cracks of the ceramic struts and the pores of the ceramic struts. Even a partial closure of the cells of the expanded ceramic by the suspension is not troublesome, as this is eliminated again after the melting of the powder components contained in the suspension and the distribution of the melt in the inner cavities of the ceramic struts, the cracks of the ceramic struts and the pores of the ceramic struts.

An expended ceramic produced in this way has a very uniform structure with respect to cell size and strut thickness, has open cells, is very strong and can be used near the melting temperature of the low-melting phase in the expanded ceramic.

When the filling material contains components reacting with the ceramic of the foam, this results, first, in a strengthening of the ceramic covering by filling the pores with reaction products and additional bonding of the ceramic particles. Second, the reaction reinforces the filling of the interior of the struts through the formation of reaction fronts and superelevated temperatures.

DESCRIPTION OF THE PREFERRED EMBODIMENTS AND BEST MODE FOR CARRYING OUT THE INVENTION

The invention will be described hereinafter with reference to several embodiment examples.

EXAMPLE 1

A ceramic water-based slurry is produced with a bimodal SiC distribution, with grain size maxima of 1 and 20 $\mu$m and a solid content of 55–65 percent by volume. A piece of polyurethane foam (10 ppi) with dimensions of 40×40×25 mm is impregnated with this slurry. The excess slurry is separated by means of a centrifuge to a mass of 15 g. The coated foam is then dried and the polyurethane is burned out at 600° C. The remaining SiC expanded ceramic is sintered at 2300° C. under an argon gas atmosphere. After cooling, wick infiltration with liquid silicon into the inner cavities, cracks and pores of the ceramic struts is carried out under a vacuum. After the silicon hardens, there results a SiC expanded ceramic in which the inner cavities of the ceramic struts, the cracks of the ceramic struts and the pores of the ceramic struts are filled with silicon. The average load at fracture when indented by an indenter having a diameter of 20 mm is 1500 N at a mass of 19 g. The load at fracture of an expanded foam of comparable SiC material (ceramically bonded or liquid-phase sintered) without filling of the pores and cavities of the ceramic struts is approximately 300 N with the same coating thickness.

EXAMPLE 2

A ceramic water-based slurry is produced with a bimodal SiC distribution, with grain size maxima of 1 and 20 μm and a solid content of 55–65 percent by volume. A piece of polyurethane foam (10 ppi) with dimensions of 40×40×25 mm is impregnated with this slurry. The excess slurry is separated by means of a centrifuge to a mass of 15 g. The coated foam is then dried and the polyurethane is burned out at 600° C. The remaining SiC expanded ceramic is sintered at 2300° C. under an argon gas atmosphere. Further, a ceramic waterbased slurry is produced with 50 percent by volume of Si powder ($d_{50}$=10 μm). The sintered expanded ceramic is impregnated with this slurry and the excess suspension is centrifuged off in a centrifuge to a weight of approximately 19 g. The impregnated sintered expanded ceramic is then dried and heated to 1600° C. under a vacuum. The applied silicon melts and saturates the SiC expanded ceramic. After the silicon hardens, there results a SiC expanded ceramic in which the inner cavities of the ceramic struts, the cracks of the ceramic struts and the pores of the ceramic struts are filled with silicon. The average load at fracture when indented by an indenter having a diameter of 20 mm is 1500 N at a mass of 19 g.

EXAMPLE 3

A ceramic water-based slurry is produced with a bimodal SiC distribution, with grain size maxima of 1 and 20 μm and a solid content of 55–65 percent by volume. A piece of polyurethane foam (40 ppi) with dimensions of 50×50×10 mm is impregnated with this slurry. The excess slurry is removed by squeezing by means of two rubber rollers. The coated foam is then dried. The polyurethane is pyrolized and 20 to 40 percent by mass, in relation to the uninfiltrated coated foam, of liquid silicon is simultaneously infiltrated into the inner cavities, cracks and pores of the ceramic struts under a vacuum at 1600° C. in one process step. After the silicon hardens, there results a SiC expanded ceramic in which the inner cavities of the ceramic struts, the cracks of the ceramic struts and the pores of the ceramic struts are filled with silicon. The average load at fracture when indented by an indenter having a diameter of 20 mm is 1000 N at a mass of 18 g

EXAMPLE 4

A ceramic water-based slurry is produced with a SiC powder with grain size maxima of 3 μm and carbon black (4% C in relation to SiC) with a solid content of 55–65 percent by volume. A piece of polyurethane foam (10 ppi) with dimensions of 40×40×25 mm is impregnated with this slurry. The excess slurry is separated by means of a centrifuge to a mass of 15 g and the coated expanded ceramic is dried. The polyurethane is pyrolized and 20 to 40 percent by mass, in relation to the uninfiltrated coated foam, of liquid silicon is simultaneously infiltrated under a vacuum at 1600° C. in one process step. The silicon initially reacts with the carbon black in the strut coatings to form secondary SiC which additionally bonds the existing SiC grains. The rest of the pores, inner cavities and cracks are subsequently filled with silicon. After the silicon hardens, there results a SiC expanded ceramic in which the inner cavities of the ceramic struts, the cracks of the ceramic struts and the pores of the ceramic struts are filled with silicon. The average load at fracture when indented by an indenter having a diameter of 20 mm is 1300 N at a mass of 19 g.

EXAMPLE 5

A ceramic water-based slurry is produced with a broad $Al_2O_3$ grain distribution (grain size maximum of 80 μm) and 10 percent by mass of clay at a solid content of 80–70 percent by volume. A piece of polyurethane foam (10 ppi) with dimensions of 40×40×25 mm is impregnated with this slurry. The excess slurry is separated by means of a centrifuge to a mass of 15 g. The coated foam is then dried and the polyurethane is burned out at 600° C. under air atmosphere. The remaining $Al_2O_3$ expanded ceramic is sintered at 1350° C. Subsequently, an infiltration of the foam is carried out with a CuTi (20% Ti) alloy at 1350° C. under a vacuum, wherein the CuTi alloy is added in liquid form. There results an expanded ceramic in which the inner cavities of the ceramic struts, the cracks of the ceramic struts and the pores of the ceramic struts are filled with a CuTi alloy. The outer covering of the struts comprises $Al_2O_3$ particles and the CuTi alloy is located between the particles. The average load at fracture when indented by an indenter having a diameter of 20 mm is 1200 N at a mass of 40 g.

EXAMPLE 6

A ceramic water-based slurry is produced with a solid content of 60percent by volume. The solid in the slurry is composed of 80 percent SiC powder with a bimodal grain size distribution with two grain size maxima of 6 and 20 μm and of 20 percent clay. A piece of polyurethane foam (10 ppi) with a diameter of 70 mm and a height of 25 mm is impregnated with this slurry. The excess slurry is separated by means of a centrifuge to a mass of 35 g. The coated foam is then dried, the polyurethane is burned out and the ceramic is sintered in a chamber furnace at 1200° C. under air atmosphere. Immediately thereafter, saturation of the sintered expanded ceramic is carried out with an aqueous suspension with 60 percent by volume of a mixture of 85% finely dispersed SiO2 and 15% sodium silicate. The excess suspension is carefully centrifuged off in the above-mentioned centrifuge to a mass increase of 25% and the saturated foam is dried. A through-type second burning is then carried out at 1200° C. After burning, there results a clay-bonded silicon carbide expanded ceramic in which the inner cavities of the ceramic struts and the cracks of the ceramic struts are almost completely filled with a silicate-type glass. The average load at fracture when indented by an indenter having a diameter of 20 mm is 800 N. In contrast, a specimen without filled struts only achieved a load at fracture of 500 N.

EXAMPLE 7

A ceramic water-based slurry is produced with a solid content of 78 percent by mass. The solid of the slurry comprises a commercial $Al_2O_3$ sinter mixture (96-%, average grain size 5 μm). A piece of polyurethane foam (30 ppi) with dimensions of 125×40×20 mm is impregnated with this slurry. The excess slurry is separated by means of a centrifuge to a mass of 60 g. The coated foam is then dried, the polyurethane is burned out and the ceramic is burned in the chamber furnace at 1650° C. under air atmosphere. Immediately thereafter, saturation of the sintered expanded ceramic is carried out with an aqueous suspension with 60 percent by volume of a finely ground frit of aluminum boron silicate glass. The excess suspension is centrifuged off in the above-mentioned centrifuge until reaching a mass increase of 30% and the saturated foam is dried. A second burning is then carried out at 1200° C. After burning, there results an aluminum oxide ceramic in which the inner cavities of the ceramic struts and the cracks of the ceramic struts are almost completely filled with a silicate-type glass. The average load at fracture when indented by an indenter having a diameter of 20 mm is 2000 N. In contrast, specimens without filled struts only achieved an average load at fracture of 1500 N.

While the foregoing description and drawings represent the present invention, it will be obvious to those skilled in the art that various changes may be made therein without departing from the true spirit and scope of the present invention.

What is claimed is:

1. An open-cell expanded ceramic comprising ceramic struts having inner cavities, cracks and pores and wherein said inner cavities, cracks and pores of the ceramic struts are filled at least partially with at least one of a group consisting of at least one metallic phase, at least one ceramic phase and at least one silicate glass phase;

wherein the inner cavities of the ceramic struts, the cracks of the ceramic struts and the pores of the ceramic struts of silicon carbide expanded ceramics are filled completely with at least one of silicon and silicon compounds.

2. The open-cell expanded ceramic according to claim 1, wherein the inner cavities of the ceramic struts, the cracks of the ceramic struts and the pores of the ceramic struts are completely filled with at least one metallic phase.

3. The open-cell expanded ceramic according to claim 1, wherein the inner cavities of the ceramic struts, the cracks of the ceramic struts and the pores of the ceramic struts are completely filled with at least one ceramic phase.

4. The open-cell expanded ceramic according to claim 1, wherein the inner cavities of the ceramic struts, the cracks of the ceramic struts and the pores of the ceramic struts are at least partially filled with at least one glass phase.

5. The open-cell expanded ceramic according to claim 1, wherein the inner cavities of the ceramic struts, the cracks of the ceramic struts and the pores of the ceramic struts are filled with silicon or silicon compounds, with molybdenum or metal silicides or with aluminum yttrium oxide or with calcium silicates or strontium calcium silicates or fluorides for silicon carbide expanded ceramics, with copper-titanium alloys or iron-titanium alloys or with titanium carbide for aluminum oxide expanded ceramics, with mullite for zirconium oxide expanded ceramics.

6. A process for the production of an open-cell expanded ceramic comprising the steps of: cutting an open-cell polymer foam to size;

coating the polymer foam with a suspension of ceramic particles in water or in a solvent;

pressing the polymer foam out and drying it;

burning out or pyrolizing the polymer foam;

subsequently sintering the ceramic particles to form a sintered expanded ceramic with struts, cavities within the struts, cracks of the ceramic struts, and pores of the ceramic struts;

during or after the sintering, filling the cavities within the ceramic struts, the cracks of the ceramic struts and the pores of the ceramic struts of the sintered expanded ceramics at least partially with a melt or a suspension;

wherein the melt and the suspension comprise materials which melt below a melting temperature of the expanded ceramic, have a coefficient of expansion similar to that of the expanded ceramic exhibit very good wetting and react partially or not at all with components of the expanded ceramic; and when the struts are filled with a the suspension, subsequently heating the expanded ceramic filled with the suspension to a temperature above the melting temperature of materials, mixtures of materials or reaction products thereof contained in the suspension;

wherein the cavities of the ceramic struts, the cracks of the ceramic struts and the pores of the ceramic struts of the sintered expanded ceramic are filled with a melt comprising silicon or silicon compounds, molybdenum or metal silicides or aluminum yttrium oxide or calcium silicates or strontium calcium silicates or fluorides for silicon carbide expanded ceramics, copper-titanium alloys or iron-titanium alloys or titanium carbide for aluminum oxide expanded ceramics, mullite for zirconium oxide expanded ceramics.

7. The process according to claim 6, wherein the cavities of the ceramic struts, the cracks of the ceramic struts and the pores of the ceramic struts of the sintered expanded ceramic are filled with a melt comprising silicon or silicon compounds, aluminum, boron, iron, copper or oxygen for silicon carbide expanded ceramics.

8. The process according to claim 6, wherein the cavities of the ceramic struts, the cracks of the ceramic struts and the pores of the ceramic struts of the sintered expanded ceramic are filled with a suspension which, in addition to the water or a the solvent, contains powder of silicon or silicon compounds with aluminum, boron, iron, copper or oxygen for silicon carbide expanded ceramics.

9. The process according to claim 6, wherein the utilized materials of which the melt is comprised or which are contained in the suspension have a contact angle of 0 to 50° in the molten state.

10. The process according to claim 6, wherein the utilized materials of which the melt is comprised or which are contained in the suspension react partially with components of the expanded ceramic in the molten state and accordingly lead to a reaction bonding with the expanded ceramic.

11. The process according to claim 6, wherein the filling of the inner cavities of the ceramic struts, cracks of the ceramic struts and pores of the ceramic struts is carried out by means of melt infiltration.

12. The process according to claim 11, wherein the melt infiltration is carried out by at least one of wick infiltration, bulk infiltration and paste infiltration.

13. A process for the production of an open-cell expanded ceramic comprising the steps of: cutting an open-cell polymer foam to size;

coating the polymer foam with a suspension of ceramic particles in water or in a solvent;

pressing the polymer foam out and drying it;

burning out or pyrolizing the polymer foam;

subsequently sintering the ceramic particles to form a sintered expanded ceramic with struts, cavities within the struts, cracks of the ceramic struts, and pores of the ceramic struts;

during or after the sintering, filling the cavities within the ceramic struts, the cracks of the ceramic struts and the pores of the ceramic struts of the sintered expanded ceramics at least partially with a melt or a suspension;

wherein the melt and the suspension comprise materials which melt below a melting temperature of the expanded ceramic, have a coefficient of expansion similar to that of the expanded ceramic exhibit very good wetting and react partially or not at all with components of the expanded ceramic; and when the struts are filled with a the suspension, subsequently heating the expanded ceramic filled with the suspension to a temperature above the melting temperature of materials, mixtures of materials or reaction products thereof contained in the suspension;

wherein the cavities of the ceramic struts, the cracks of the ceramic struts and the pores of the ceramic struts of the sintered expanded ceramic are filled with a suspension which, in addition to the water or the solvent, comprises powder of silicon or silicon compounds, molybdenum or metal silicides or aluminum yttrium oxide or calcium silicates or strontium calcium silicates or fluorides for silicon carbide expanded ceramics, copper-titanium alloys or iron-titanium alloys or titanium carbide for aluminum oxide expanded ceramics, mullite for zirconium oxide expanded ceramics.

14. A process for the production of an open-cell expanded ceramic comprising the steps of: cutting an open-cell polymer foam to size;

coating the polymer foam with a suspension of ceramic particles in water or in a solvent;

pressing the polymer foam out and drying it;

burning out or pyrolizing the polymer foam;

subsequently sintering the ceramic particles to form a sintered expanded ceramic with struts, cavities within the struts, cracks of the ceramic struts, and pores of the ceramic struts;

during or after the sintering, filling the cavities within the ceramic struts, the cracks of the ceramic struts and the pores of the ceramic struts of the sintered expanded ceramics at least partially with a melt or a suspension;

wherein the melt and the suspension comprise materials which melt below a melting temperature of the expanded ceramic, have a coefficient of expansion similar to that of the expanded ceramic exhibit very good wetting and react partially or not at all with components of the expanded ceramic; and when the struts are filled with a the suspension, subsequently heating the expanded ceramic filled with the suspension to a temperature above the melting temperature of materials, mixtures of materials or reaction products thereof contained in the suspension;

wherein the cavities of the ceramic struts, the cracks of the ceramic struts and the pores of the ceramic struts of the sintered expanded ceramic are filled with a suspension which, in addition to the water or the solvent, contains powder of glass frit.

15. The process according to claim 14, wherein glass frit comprising frit of one or more boron silicate glasses, aluminum boron silicate glasses and/or lithium aluminum silicate glasses is used.

* * * * *